Patented Aug. 22, 1933

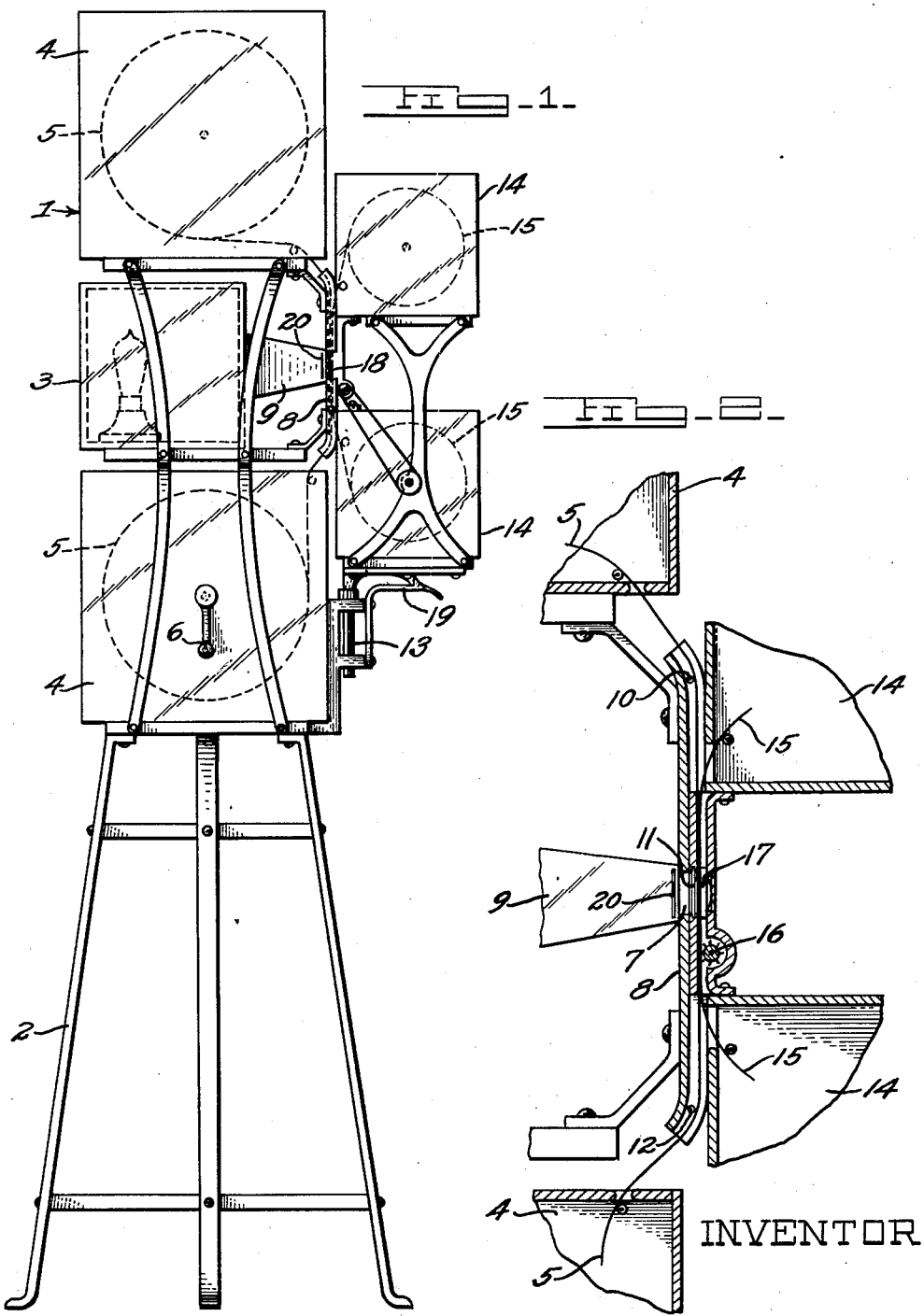

1,923,087

UNITED STATES PATENT OFFICE 1,923,087

PRINTING MACHINE FOR MAKING FILM STRIP SLIDES FROM POSITIVE OR NEGATIVE MOTION PICTURE FILMS

George R. Goergens, Washington, D. C., assignor to Arthur M. Hyde, as Secretary of Agriculture of the United States of America Application July 21, 1931. Serial No. 552,184

1 Claim. (Cl. 95—75)

(Granted under the Act of March 3, 1883, as amended April 30, 1928; 370 O. G. 757)

This application is made under the Act of March 3, 1883, as amended by the Act of April 30, 1928, and the invention herein described, if patented, may be manufactured and used by or for the Government for governmental purposes without the payment to me of any royalty thereon.

My invention relates to a machine for printing film strip slides by contact printing from a positive film to an unexposed negative film, by passing the unexposed film, frame by frame, in contact with a negative or positive film, in front of an aperture gate.

Where suitable subject-matter is available in motion picture negative, or positive, it eliminates the necessity of enlarging, reducing, and masking individual prints, and also makes practicable the transfer of scenes and titles in existing films to a film strip, thereby eliminating largely the work of selection of photographs, writing and editing of titles, preparation of title cards, and the making of negatives, which must all be done in the preparation of film strip lectures. In view of the large number of motion picture films suitable for transfer to film strips, the employment of my invention will result in a considerable saving of time and expense, and place within reach of lecturers and others the subject-matter assembled in motion pictures.

The present method of making film strips is as follows: First, suitable photographs are selected and legends are written to fit the topic. The pictures are then reduced or enlarged to a uniform size. The uniform pictures are then photographed on a motion picture strip film. Title cards are made in the same size as the pictures, and all are photographed on the film strip, in proper sequence.

I attained the object of my invention by the mechanism illustrated in the accompanying drawing, in which Figure 1 is a side elevation of the entire machine. Figure 2 is a side elevation of the principal working parts.

Similar numerals refer to similar parts throughout the several views.

The printer 1 is mounted on a metal frame or stand 2 with a light house 3 fitted with rheostat, by suitable means not shown, that will increase or decrease the light as required for the various film densities. Magazine 4 houses the positive film 5 with a rewind crank 6 on lower magazine 4 to wind film 5. The light is brought to a point at the aperture frame 7 in the film track 8 which is mounted, by suitable means not shown, in front of cone 9 attached to light house 3.

Film 5 passes from upper magazine 4 over an idler 10 down film track 8 which has a small aperture 11, the size of a frame, over a second idler 12 and into lower magazine 4.

In front of the light house 3 and mounted on a small pivot post 13 are two magazines 14 to hold the unexposed film 15 with a sprocket 16 that will turn film 15 one frame at a time over a pressure plate 17 to insure perfect contact during exposure of the two films 5 and 15.

As unexposed film 15 is moved over small film track 8 and into lower magazine 4 it passes over pressure plate 17 at aperture 11. Slide 18 is inserted between aperture 11 and pressure plate 17 to protect film 15 as it passes from upper to lower magazine 14 when both magazine and mechanism is swung out of place on pivot pin 13 to view the positive and select the proper scenes or titles to be next exposed.

As positive film 5 is wound past aperture 11 the scene can be selected and the light value can be judged by the exposure time.

A heavy spring catch 19 holds the mechanism in place when swung into contact with the surface of positive film 5.

A shutter 20 should be mounted in the cone to control the exposure.

Having thus fully and clearly described my invention, what I claim as new and desire to secure by Letters Patent is:

I claim:

A device for selectively printing titles and scenes from a continuous reel of film, which comprises the combination of a motion-picture machine, having a light house with an aperture and fitted with a rheostat in rear thereof, with a pivotally mounted structure having upper and lower magazines for holding unexposed film; means for exposing said film; means for independently feeding said film; means for carrying said film in operative relationship to an exposed film carried by the main mechanism; and means for independently feeding said exposed film past said aperture mounted on said main mechanism.

GEORGE R. GOERGENS.